United States Patent
Tokuyoshi (10) Patent No.: US 9,824,487 B2
(45) Date of Patent: Nov. 21, 2017

(54) STORAGE MEDIUM, LUMINANCE COMPUTATION APPARATUS AND LUMINANCE COMPUTATION METHOD

(71) Applicant: SQUARE ENIX CO., LTD., Tokyo (JP)

(72) Inventor: Yusuke Tokuyoshi, Tokyo (JP)

(73) Assignee: SQUARE ENIX CO., LTD., Tokyo (JP)

( * ) Notice: Subject to any disclaimer, the term of this patent is extended or adjusted under 35 U.S.C. 154(b) by 6 days.

(21) Appl. No.: 14/859,862

(22) Filed: Sep. 21, 2015

(65) Prior Publication Data
US 2016/0125643 A1    May 5, 2016

(30) Foreign Application Priority Data
Oct. 31, 2014    (JP) .................. 2014-223753

(51) Int. Cl.
*G06T 15/50*    (2011.01)
*G06T 15/60*    (2006.01)

(52) U.S. Cl.
CPC .............. *G06T 15/60* (2013.01); *G06T 15/50* (2013.01); *G06T 15/506* (2013.01); *G06T 2200/04* (2013.01)

(58) Field of Classification Search
CPC ..... G06T 15/506; G06T 11/001; G06T 11/60; G06T 5/40; G06T 15/50; G06T 15/60; G09G 5/02
USPC .................. 345/426, 581, 589, 619; 382/274
See application file for complete search history.

(56) References Cited

U.S. PATENT DOCUMENTS

| | | | | |
|---|---|---|---|---|
| 5,936,633 A | * | 8/1999 | Aono | G06T 15/50 345/589 |
| 8,638,331 B1 | | 1/2014 | Jarosz et al. | |
| 8,855,371 B2 | * | 10/2014 | Tsukada | H04N 1/62 345/426 |

(Continued)

OTHER PUBLICATIONS

Ritschel et al, "Imperfect Shadow Maps for Efficient Computation of Indirect Illumination", ACM Trans. Graph. 27, 2008, pp. 129:1-129:8.

(Continued)

*Primary Examiner* — Ke Xiao
*Assistant Examiner* — Andrew Shin
(74) *Attorney, Agent, or Firm* — Greenblum & Bernstein, P.L.C.

(57) ABSTRACT

A luminance computation apparatus obtains information of light sources defined in a scene that is rendered, and defines a stochastic function used to determine whether or not to use a light source in a luminance computation for an object that is a predetermined distance from the light source corresponding to a luminance attenuation function in accordance with a distance from the light source for each of the light sources that are defined; The apparatus determines for each of the defined light sources a stochastic effective area of the light source based on the stochastic function for the respective defined light source, and performs a luminance computation for the predetermined object in the scene based on the stochastic function and the attenuation function of a light source for which the determined stochastic effective area is included in the object.

6 Claims, 3 Drawing Sheets

(56) References Cited

U.S. PATENT DOCUMENTS

| | | | | |
|---|---|---|---|---|
| 2004/0263511 | A1* | 12/2004 | West | G06T 15/40 345/421 |
| 2007/0008310 | A1* | 1/2007 | Hahn | G06T 15/506 345/419 |
| 2007/0247460 | A1* | 10/2007 | Smitt | G06T 15/50 345/427 |
| 2011/0157314 | A1* | 6/2011 | Kurino | G06T 15/506 348/46 |
| 2013/0002671 | A1 | 1/2013 | Armsden et al. | |

OTHER PUBLICATIONS

Olsson et al., "Tiled Shading", Journal of Graphics, GPU, and Game Tools, vol. 15, No. 4, 2011, pp. 235-251.

Search Report issued by EP patent office in EP Patent Application No. 15187440.1, dated Apr. 29, 2016.

* cited by examiner

STORAGE MEDIUM, LUMINANCE COMPUTATION APPARATUS AND LUMINANCE COMPUTATION METHOD

BACKGROUND OF THE INVENTION

Field of the Invention

The present invention relates to a storage medium, a luminance computation apparatus, and a luminance computation method, and particularly to a technique for acceleration of a luminance computation in a real-time rendering.

Description of the Related Art

In the field of the computer graphics (CG) for computerized games, or the like, various methods have been proposed for reproducing an expression more realistically. One such method is a method in which an influence of a light source defined in a scene that is rendered, i.e. a luminance change of an object (a shading point) in the scene due to a light source defined in the scene in a screen that is rendered, is obtained by a so-called rendering equation that considers a bidirectional reflectance distribution function (BRDF) for an object.

Note that to improve a realism regarding a luminance of graphics that are rendered, a method that considers influences of a plurality of light sources (direct light sources) defined in a scene that is to be rendered, and of indirect light sources that further irradiate other objects due to a direct light source being reflected by an object arranged in the scene is employed. In this method, for each object rendered in respective pixels within an output screen, it is possible obtain a more correct luminance computation result by summing up influences of all light sources that may irradiate the object.

However, if it is necessary to perform rendering processing for a screen for each frame in real-time, such as for interactive moving image content, for example, it is possible that computing an influence of all of the light sources that may irradiate an object of a respective pixel for each of the pixels of the screen will result in a large a computation amount. For this reason, frame delays, processing failure, or the like may occur because it is impossible to complete the all rendering processing within a frame interval.

Meanwhile, in the real world, the influence of a light source reduces in accordance with the distance of the light source. For this reason, in graphics expressions in which realism is enhanced, for each light source that is defined, an attenuation function (a fall-off function) with a monotonic decrease such as one in which the intensity is reduced as the distance-to-arrival of the light is larger is set. Accordingly, even if the influence of all light sources is computed, a computation for a shading point existing at a distance for which the intensity at the time of arrival is not higher than a predetermined value will have a small influence on the screen that is rendered, and an effect that is worth the computation amount will not be achieved. In Ola Olsson et al., "Tiled Shading", Journal of Graphics, GPU, and Game Tools, Vol. 15, No. 4, 2011, pp. 235-251, a method in which such light sources whose contribution to the shading point is small are excluded, effective areas for which a computation amount should be reduced are defined for each light source, and for each tile into which the screen that is generated is divided, only influences of light sources whose effective area is included in the tile are made to be targets of a luminance computation for pixels included in the tile (culling) is disclosed.

However, there is the possibility that because a fall-off function having an effective area of a light source as is described in Olsson et al. is normally defined by a graphic designer, the computation amount is not reduced by the definition. In particular, because the fall-off function, which is defined for a more realistic expression, is inversely proportional to the square of the distance, and is asymptotic at an infinite distance, an effective area is not defined, and so a computation amount cannot be reduced.

While it is possible to reduce a computation amount by, in response to this, employing a method (clamping) that sets the effective area forcibly, in such a case, there is the possibility that the luminance of particular objects in the screen will become lower, and that thereby it will become difficult for a viewer to see the scene, or that the luminance expression will not be as envisioned by the designer.

SUMMARY OF THE INVENTION

The present invention was made in view of such problems in the conventional technique. The present invention provides a storage medium, a luminance computation apparatus, and a luminance computation method for realizing a desired luminance expression while reducing a computation amount.

The present invention in its first aspect provides a non-transitory computer readable storage medium storing a program that causes a computer to execute: processing for obtaining information of light sources defined in a scene that is to be rendered; processing for defining a stochastic function used to determine whether or not to use a light source in a luminance computation for an object that is a predetermined distance from the light source corresponding to a luminance attenuation function in accordance with a distance from the light source for each of the light sources that are defined; processing for determining for each of the defined light sources a stochastic effective area of the light source based on the stochastic function for the respective defined light source; and processing for performing a luminance computation for the predetermined object in the scene based on the stochastic function and the attenuation function of a light source for which the stochastic effective area is included in the object.

The present invention in its second aspect provides a luminance computation apparatus comprising: an obtainer which is able to obtain information of light sources defined in a scene that is to be rendered; a definer which is able to define a stochastic function used to determine whether or not to use a light source in a luminance computation for an object that is a predetermined distance from the light source corresponding to a luminance attenuation function in accordance with a distance from the light source for each of the light sources that are defined; a determiner which is able to determine for each of the defined light sources a stochastic effective area of the light source based on the stochastic function for the respective defined light source; and a computator which is able to perform a luminance computation for the predetermined object in the scene based on the stochastic function and the attenuation function of a light source for which the stochastic effective area determined by the determiner is included in the object.

The present invention in its third aspect provides a luminance computation method comprising: obtaining information of light sources defined in a scene that is to be rendered; defining a stochastic function used to determine whether or not to use a light source in a luminance computation for an object that is a predetermined distance from the light source corresponding to a luminance attenuation function in accordance with a distance from the light source for each of the light sources that are defined; determining for each of the defined light sources a stochastic effective area of the light source based on the stochastic function for the respective defined light source; and performing a luminance computation for the predetermined object in the scene based on the stochastic function and the attenuation function of a light source for which the determined stochastic effective area is included in the object.

Further features of the present invention will become apparent from the following description of exemplary embodiments (with reference to the attached drawings).

DESCRIPTION OF THE EMBODIMENTS

First Embodiment

Exemplary embodiments of the present invention will be described hereinafter in detail, with reference to the accompanying drawings. Note that an embodiment explained below explains an example in which the present invention is applied to a game console 100, that is capable of generating game screens in which a luminance computation based on a light source defined in a scene that is to be rendered is reflected, as an example of a luminance computation apparatus. However, the present invention can be applied to any device capable of performing a luminance computation based on a light source defined in a scene that is to be rendered.

<Configuration of Game Console 100>

Figure 1:
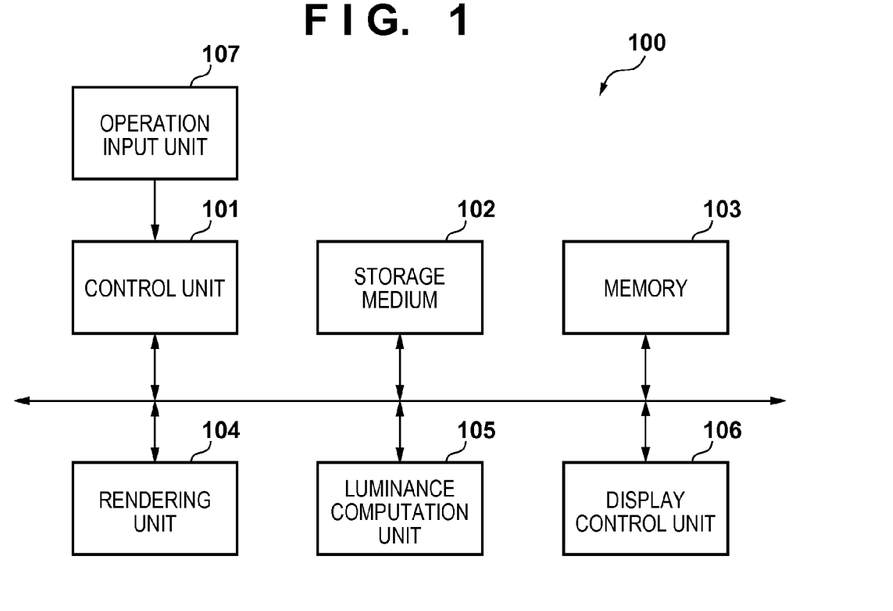
FIG. 1 is a block diagram for illustrating a functional configuration of a game console 100 according to embodiments of the present invention.

FIG. 1 is a block diagram for illustrating a functional configuration of the game console 100 according to embodiments of the present invention.

A control unit 101 is, for example, a CPU, or the like, and controls operation of blocks that the game console 100 comprises. The control unit 101 controls operation of respective blocks by reading an operation program of a respective block which is stored in a storage medium 102, loading the program into a memory 103, and executing the program.

The storage medium 102 is a non-volatile storage apparatus, such as a rewritable ROM or an HDD, for example, configured to be able to hold data permanently and including a removable storage medium such as optical media that can be read by inserting into a predetermined optical drive. The storage medium 102, in addition to operation programs for blocks that the game console 100 comprises, stores parameters necessary in the operation of the blocks, application data and programs corresponding to game content that a user that uses the game console 100 can experience, or the like.

The memory 103 is a volatile storage apparatus such as a RAM, for example. The memory 103 is used as a storage region for temporarily storing intermediate data output in operation of the blocks in addition to as a loading region of operation programs for the blocks.

A rendering unit 104 is a rendering apparatus, such as a GPU, for example, for performing rendering processing for a game screen. The rendering unit 104 performs rendering of game screens in accordance with rendering commands generated as the result of processing for a game. Also, because a GPU excels in capability for parallel computational processing of a plurality of processes, the rendering unit 104 may perform processing that the control unit 101 or a luminance computation unit 105 execute in their place.

The luminance computation unit 105 executes later explained luminance computation processing, and obtains luminances of objects arranged in a game screen rendered by the rendering unit 104 in units of pixels. In the present embodiment, the luminance computation unit 105 divides a game screen into a plurality of regions, and after extracting a light source whose contribution should be considered for each region, performs luminance computation processing based on a distance from a light source for an object (shading point) corresponding to respective pixels.

A display control unit 106 performs display control to output game screens rendered by the luminance computation unit 105 at a predetermined frequency (frame rate) to a display device connected to the game console 100. The display device may be something that is externally connected to the game console 100, or may be something that is built-into the same housing as the game console 100.

An operation input unit 107 is a user interface for performing operation input which the game console 100 comprises such as, for example, an analog stick, a button, a keyboard, a mouse, a touch detection sensor, or the like. The operation input unit 107 transmits to the control unit 101 information for identifying an operation input when it is detected that the operation input is performed.

<Determination of Effective Area of Light Source>

Here detailed explanation will be given with reference to figures for a method in the game console 100 of the present embodiment of suitably determining an effective area for each light source defined in advance in a predetermined scene, i.e. a distance range for which a contribution of a light source should be considered for a shading point.

As described above, one or more light sources defined by a designer are defined in a scene that is expressed in three-dimensional graphics in game content. Definition of a light source is performed by light source coordinates/direction, attributes, tint, fall-off function or the like being set. Also, to enable a luminance expression with high realism, light sources include not only direct light sources defined as illuminants in the scene, but also indirect light sources such as VPLs (Virtual Point Light) defined at points at which a photon emitted from a direct light source hits with a particular object surface. In the explanation below, a method for determining an effective area (radius) for a point light source which is a direct light source, is exemplified in order to simplify the explanation, but it should be easily understood that that the present invention can be applied for light sources having other attributes, and to indirect light sources.

Note that in order to perform a luminance expression that is similar to a light source in the real world, generally a light source fall-off function is defined as a monotonically decreasing function such as one which is inversely proportional to the square of the distance, for example. However, because the intensity only tends to 0 when the distance between the shading point and the light source approaches an infinite distance when a fall-off function that is inversely proportional to the square of the distance is used, theoretically there will exist a certain amount of contribution of any light source. Whether or not to include a light source having a small contribution in a luminance calculation can be determined stochastically using a so-called Russian roulette method. Accordingly, the present invention, for each light source, defines a stochastic function p(x) in accordance with a distance for determining if the light source contributes to a luminance expression, defines an effective area (a stochastic effective area) stochastically based on a distribution of the stochastic function, and weights a fall-off function f(x) for each light source based on the stochastic function of the area, and thereby determines a fall-off function $f_w(x)$ for each light source that is statistically unbiased and makes an application area be a stochastic effective area.

<Stochastic Function p(x)>

Because a fall-off function f(x) defined for a light source is a monotonically decreasing function, it is advantageous that the stochastic function p(x) similarly be a monotonically decreasing function. That is, because the contribution to the luminance computation of a light source decreases as the distance from the light source of a shading point increases, even if a computation for the light source in the luminance computation processing of the shading point is rejected (not selected), the error that this will cause in the result of the computation for the shading point will be accordingly small. Considering computation efficiency, computation result precision, and the like, it is advantageous that the fall-off function f(x) and the stochastic function p(x) be of the same form, i.e. be in a proportional relationship, but working of the present invention is not limited to this.

Also, in the present embodiment, because in the determination of a stochastic effective area of a respective light source, a stochastic effective area r is calculated for the light source using a corresponding random number after determining a uniform random number for each light source for all shading points, i.e. in all distances, the stochastic function p(x) is made to be something for which an inverse function can be calculated.

Figure 2:
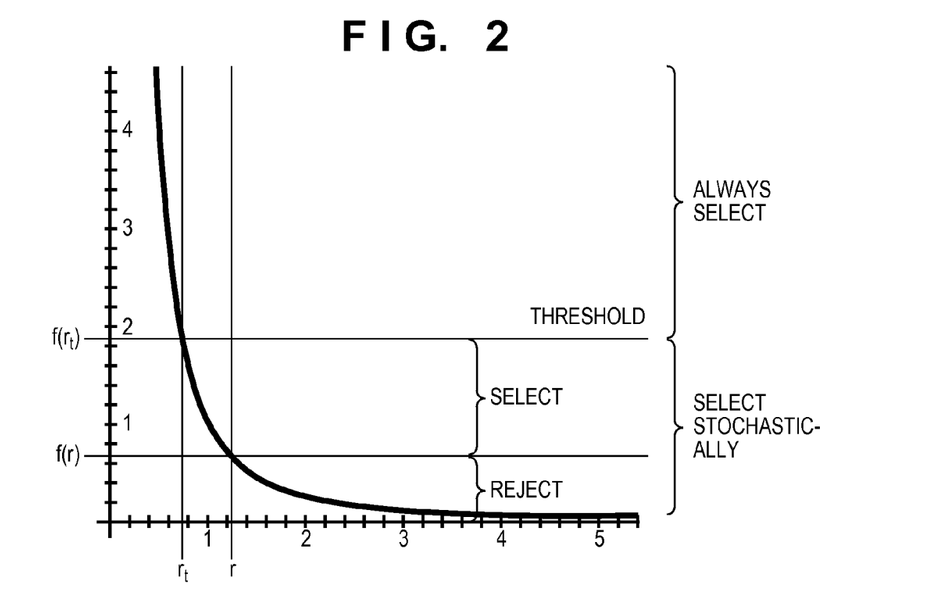
FIG. 2 is a view for explaining a stochastic function defined for a light source according to embodiments of the present invention.

Assuming that the fall-off function f(x) of the light source is a monotonically decreasing function, an ideal stochastic function p(x), as shown in FIG. 2, can classify into a distance range for which a contribution to the luminance computation always should be considered ($x \leq r_t$) and a distance range for which a contribution to the luminance computation should be considered stochastically ($r_t < x < \infty$):

$$p(x) = \frac{\min(f(r_t), f(x))}{f(r_t)}.$$

Here, when the selection condition $p(x) \leq \xi$ is defined based on a uniform random number $\xi=(0, 1]$ which is generated for the light source in accordance with the Russian roulette method, the radius of the stochastic effective area is:

$$r = f^{-1}(\xi \cdot f(r_t))$$

For example, if the fall-off function f(x) of the light source is simply inversely proportional to the square of the distance to the shading, the stochastic function p(x) is:

$$p(x) = \frac{\min\left(\frac{1}{r_t^2}, \frac{1}{x^2}\right)}{\frac{1}{r_t^2}} = \min\left(1, \frac{r_t^2}{x^2}\right),$$

and the radius of the stochastic effective area obtained by solving:

$$r^2 = \frac{r_t^2}{\xi}.$$

<Radius Threshold $r_t$ for Always Considering Contribution>

For example, the fall-off function f(x) is infinity at distance 0 in the case where it is inversely proportional to the square of the distance, and even if a stochastic function p(x) which is proportional to this is defined, processing for generation of random numbers corresponding to 0 to ∞ cannot be executed, and therefore it is necessary to set $r_t$ for which the contribution to the luminance computation always should be considered from the viewpoint of processing in this kind of stochastic function.

Also, the threshold $r_t$ may be configured to be settable by a user, a developer, or the like, for example, and is a value for which it is advantageous that it be changed in accordance with a requested quality for a computation result. In other words, if the threshold $r_t$ is small, a computation amount for the luminance computation can be reduced on the whole in proportion to the reduction in the number of shading points included in the distance range at which shading points are selected as those whose contribution in the luminance computation is always considered, and thereby it is possible to optimize the luminance computation processing. However, the smaller the threshold $r_t$ is, the higher the possibility that the contribution from the light source will not be considered for a shading point that exists close to the light source but whose distance therefrom is greater than the threshold, and therefore it is possible that the quality of the result of the computation will be lower. Conversely, if the threshold $r_t$ is large, a computation amount for the luminance computation will increase on the whole because the number of shading points included in the distance range at which shading points are selected as those whose contribution in the luminance computation is always considered will become large, the luminance computation processing will become slow. However, the larger the threshold $r_t$ is, the more the shading points for which correct computation will be performed considering the contribution from the light source will increase, and therefore the higher the quality of the result of the computation that is achieved will be.

For this reason, in the present embodiment, for the threshold $r_t$ of the light source, for example, the BRDF for all shading points is ignored, and it is assumed that all shading points are a Lambertian surface of reflectance 1, and by the following equation:

$$L_t = E \frac{I \cdot f(r_t)}{\pi}$$

the threshold $r_t$ is obtained based on the quality. Here, Lt is an allowable error in gradation expression precision of a display device, or the like, set by a user, developer, or the like, for example; E is an exposure value defined for a camera that renders the scene; and I is a radiant intensity of the light source.

Note that in a case where relatively many light sources are defined for a narrow region in a scene, such as VPLs, a luminance saturation may occur in the periphery of that region. In such a case, because an exposure value and a radiant intensity are made to be small so that saturation does not occur, the threshold $r_t$ can be reduced as shown in this equation if the fall-off function is a monotonically decreasing function. In other words, the threshold $r_t$ can be reduced maintaining quality in a scene where many light sources are defined in a narrow region, and it is possible that the probability that the stochastic effective area r will become smaller will increase in conjunction with this, thereby enabling the reduction of the computation amount for the luminance computation processing on the whole.

<Statistically Unbiased Fall-off Function>

The stochastic effective area r determined as described above is something that is determined for each light source based on a uniform random number generated independently of a distance of the light source. In other words, the stochastic function p(x) defined for that area is a function for which a stochastic sampling based on a random number generated in order to determine whether or not to consider the contribution to the luminance computation in relation to a distance range to an infinite distance, which would have originally been considered, is defined so as to be statistically unbiased in the effective area. Accordingly, the luminance computation unit 105 of the present embodiment can realize a reduction of a computation amount on the whole in the luminance computation processing while suppressing a quality reduction by using the stochastic effective area r, which is determined stochastically for each light source by weighting the fall-off function f(x) of the light source based on that stochastic function p(x), and a weighted statistically unbiased fall-off function $f_w(x)$.

Figure 3A:
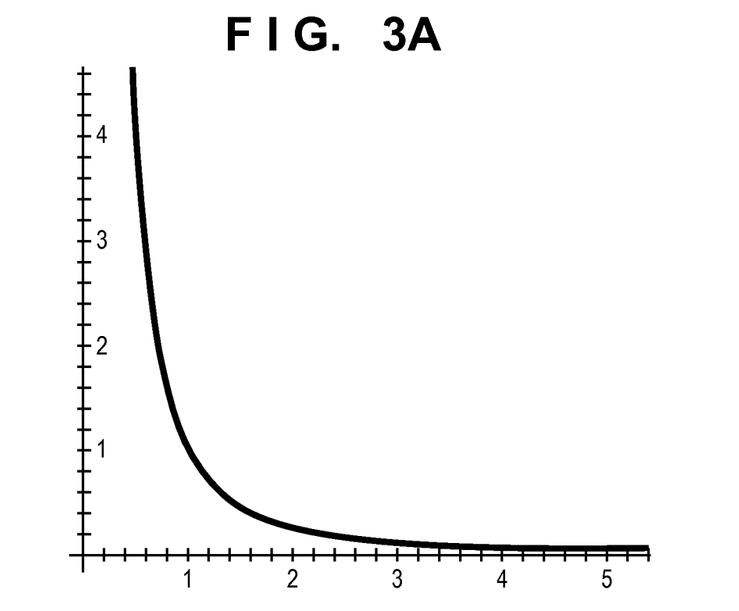
FIGS. 3A and 3B are views for explaining a fall-off function having a stochastic effective area and for which a statistically unbiased weighting is performed, according to embodiments of the present invention.
Figure 3B:
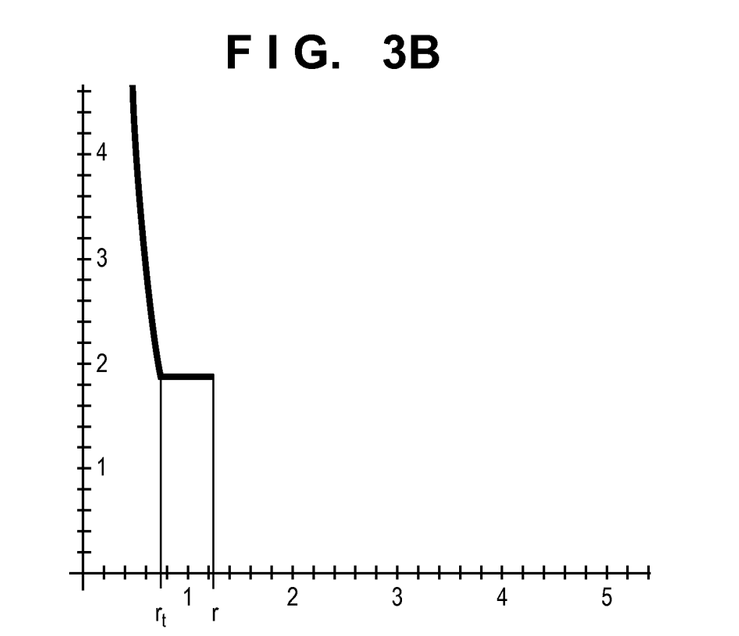

For example, in a case where for a particular light source the fall-off function f(x) and the stochastic function p(x) are in a proportional relationship where $x>r_t$, the monotonically decreasing fall-off function f(x) which is inversely proportional to the square of the distance from the light source as in FIG. 3A is weighted based on multiplying a setting of the stochastic effective area r and a reciprocal of p(x), and the weighted fall-off function $f_w(x)$, as in FIG. 3B, becomes the fall-off function that may be considered in the luminance computation processing.

<Luminance Computation Processing>

Figure 4:
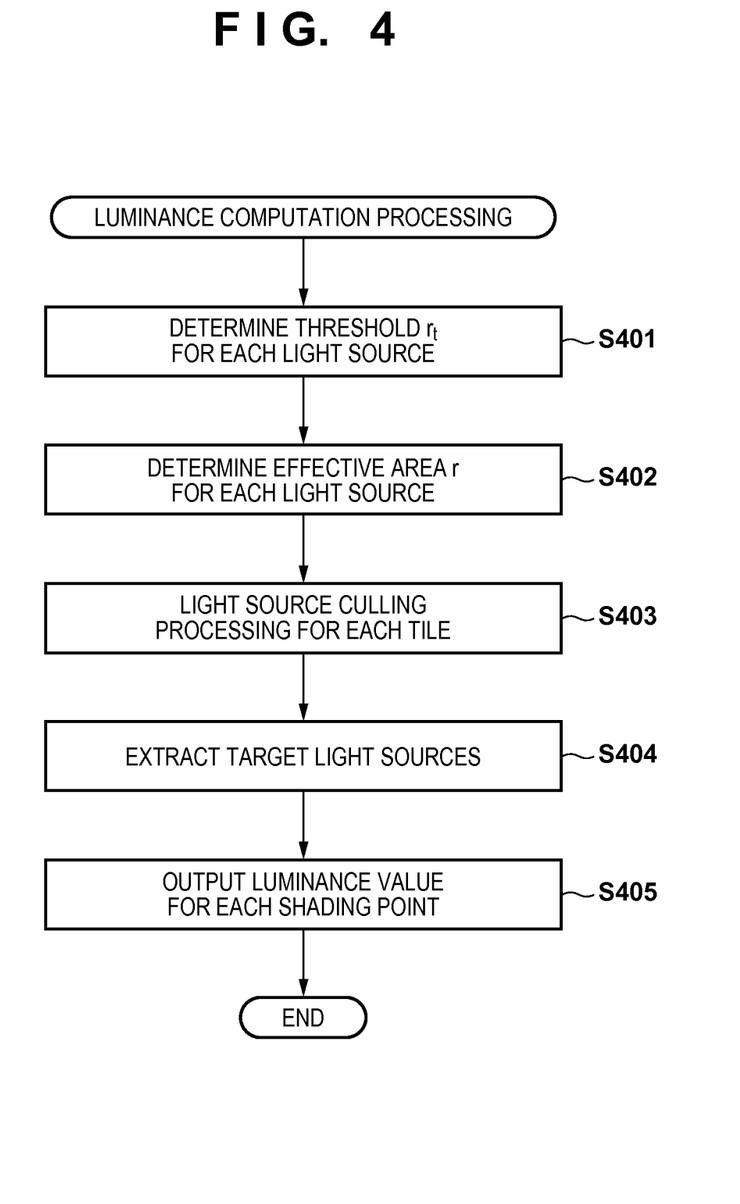
FIG. 4 is a flowchart for exemplifying luminance computation processing executed in the game console 100 according to a first embodiment of the present invention.

Explanation is given for detailed processing using the flowchart of FIG. 4 for luminance computation processing which is executed in the game console 100 of the present embodiment having this kind of configuration. The following operations can be realized by the luminance computation unit 105 by the control unit 101 reading a corresponding processing program stored in the storage medium 102, for example, loading it into the memory 103, and executing it for the processing corresponding to this flowchart. Note explanation is given having the luminance computation processing started when rendering processing of a game screen for game content, for example, is performed, and executed every rendering process for a game screen of a respective frame.

In step S401, the luminance computation unit 105, for each light source that is defined for a scene (a target scene) that is rendered, determines a threshold $r_t$ based on a predetermined requested quality. Note that explanation is given having the threshold $r_t$ determined for each light source in the luminance computation processing of the present embodiment be determined based on the above described equation based on the quality, but working of the present invention is not limited to this. In other words, while the threshold $r_t$ determined based on the above described equation satisfies a requested quality, and realizes the luminance computation processing with a suitable computation amount, configuration may be taken such that it is determined according to a different method in accordance with a fall-off function defined for a light source, and the computational capabilities of the apparatus that executes this processing.

In step S402, the luminance computation unit 105 generates a uniform random number ξ for each light source defined for a target scene, and determines the stochastic effective area r of each light source based on the threshold $r_t$ determined in step S401.

In step S403, the luminance computation unit 105 divides the game screen that is rendered into a plurality of tiles, and performs culling processing to exclude, for each of the tiles, light sources for which the stochastic effective area is not included in the region of the tile in screen coordinates.

In step S404, the luminance computation unit 105, for each tile, calculates a distance between the light sources extracted as the result of the culling processing and each pixel (shading point) in the tile, and further extracts light sources (target light source) whose contribution in the luminance computation of the shading point should be considered. That is, the luminance computation unit 105, for each shading point, extracts, as the target light sources for that shading point, light sources for which that shading point is included in the stochastic effective area from the light sources extracted as the result of the culling processing.

In step S405, the luminance computation unit 105, for each shading point, totals results obtained by performing the luminance computation based on the fall-off function $f_w(x)$ after weighting of each target light source for the respective shading point, and outputs the total as a luminance value for the shading point. A luminance value obtained in this way is reflected in the rendering result of a corresponding pixel for rendering processing of a game screen executed in parallel.

With such a configuration, it is possible to reduce the computation amount for the luminance computation processing while maintaining the requested quality by defining the effective areas for each light source stochastically in the luminance computation processing of the present embodiment. Note that the processing of step S403-step S405 may be performed selecting tiles and shading points in order, and may be performed in parallel for a plurality of tiles or shading points. Also, explanation was given for extracting target light sources after performing culling processing in the luminance computation processing of the present embodiment by performing a tile division as in Olsson et al., but it should be easily understood that the tile division in the embodiment of the present invention is not necessary.

Additionally, in the present embodiment, explanation was given for performing generation of a screen reflecting a result of computation of the luminance computation processing in the game console 100 comprising the luminance computation unit 105, but working of the present invention is not limited to this. In other words, it is not necessarily that the luminance computation processing and the screen generation processing be executed on the same device, and these may be performed by dividedly amongst a plurality of devices capable of data reception. For example, in a so-called cloud-type game service, an apparatus that performs the luminance computation processing and a server that performs rendering of the game screens may be separated, and configuration may be taken such that in order to enrich a screen generated by rendering processing in a client apparatus such as a home game console, a luminance computation result is provided from another device that is connected via a network, for example, and rendering processing is performed on the client apparatus using that.

As explained above, the luminance computation apparatus of the present embodiment is able to realize a desired luminance expression while reducing a computation amount.

Second Embodiment

In the above described embodiment, explanation was given for a method in which, in order to reduce a computation amount of the luminance computation processing for a shading point, luminance computation processing, having a stochastic effective area for which a desired luminance expression can be realized, is executed using a fall-off function after statistically unbiased weighting, but the stochastic effective area determined in this way can be used outside of luminance computation processing.

There are cases where a shading occurs for objects to be arranged in a scene by a ray from a light source being occluded by another object. To render this kind of shading, a method of generating in advance a shadow map indicating a depth to a closest object for a projection from a light source, and determining whether or not to render the shading for the object based on the shadow map is used. However, while there is no particular problem in a case where the light source and the object do not change, it is necessary to generate these shadow maps every time rendering of a screen is performed in a case where positions of the light source and the object change dynamically. Furthermore, when VPLs, or the like, defined by a photon emitted from a light source colliding with an object as described above are considered, it is necessary to generate shadow maps for each of these, and it is necessary to render a large number of shadow maps at high speed in order to render screens more realistically in game content, or the like.

As a method for rendering such a large number of shadow maps at high speed, a method for expressing at a point of a predetermined resolution a scene in a projection of a light source, and generating a large number of low resolution shadow maps (ISM) by point splatting processing is disclosed in "Imperfect Shadow Maps for Efficient Computation of Indirect Illumination", ACM Trans. Graph. 27, 129:1-129:8, 2008" by T. Ritschel et al.

However, while the Ritschel method calculates the depth of each point upon ISM generation, this depends on a contribution corresponding to a luminance computation by the light source being considered up to an infinite distance. In other words, whatever the attribute of the light source and the fall-off function are, because the ISM is something for which the distance between the light source and the first object existing in the direction of the respective point is purely calculated, there is the presupposition that shading will occur due to the light source. In other words, for a point indicating an object arranged at a position that is far from a light source, unnecessary splatting processing will occur even though the contribution can be ignored.

Accordingly, in the generation of the ISM, it is possible to exclude unnecessary processing by generating a stochastic effective area as is illustrated in the first embodiment. That is, in the generation of the ISM for one light source, for example, because it is necessary to reflect a depth value corresponding to a point if it is outside of a stochastic effective area obtained for the light source, it is possible to cull the point from the generation of the ISM. Consequently, because it is not necessary to perform unnecessary splatting processing as described above, it is possible to reduce the overall computation amount for rendering processing of a screen as a result.

Other Embodiments

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions. Also, the luminance computation apparatus and the luminance computation method according to the present invention are realizable by a program executing the methods on one or more computers. The program is providable/distributable by being stored on a computer-readable storage medium or through an electronic communication line.

This application claims the benefit of Japanese Patent Application No. 2014-223753, filed Oct. 31, 2014, which is hereby incorporated by reference herein in its entirety.

What is claimed is:

1. A non-transitory computer readable storage medium storing a program that causes a computer to execute:

obtaining information of light sources defined in a scene that is to be rendered;

defining, for each of the light sources, a stochastic function with respect to an object that is a predetermined distance from a respective light source, each of the light sources corresponding to a luminance attenuation function in accordance with a distance;

determining, for each of the light sources, a stochastic effective area of the light source based on the stochastic function for the respective light source;

determining, for each of the light sources, whether the stochastic effective area is above a predetermined threshold;

performing a luminance computation for the object in the scene based on one or more light sources, among the light sources, determined to have stochastic effective areas above the predetermined threshold; and setting a quality for a luminance of a screen for which the scene is rendered, wherein one or more light sources, among the light sources, having stochastic effective areas below the predetermined threshold are omitted from the luminance computation, wherein the performing the luminance computation includes performing the luminance computation of the object using a new attenuation function that is statistically unbiased and is obtained by performing a weighting based on the stochastic function of one or more light sources, among the light sources, having a stochastic effective area of the light source, and the new attenuation function indicates an attenuation function prior to performing a weighting in a range from a corresponding light source until a distance range is defined based on the set quality.

2. The storage medium according to claim 1, wherein the determining of the stochastic effective area is based on the stochastic function and a random number determined for each of the light sources.

3. The storage medium according to claim 1, wherein the program further causes the computer to execute generating a shadow map for each of the light sources, and the generating does not reflect in the shadow map, an object of a distance exceeding the stochastic effective area for the respective light source.

4. The storage medium according to claim 3, wherein the shadow map is generated by applying splatting processing after calculating a distance until a ray emitted from a light source in a predetermined direction first hits, and the generating does not apply the splatting processing for a point at a distance that exceeds the stochastic effective area.

5. A luminance computation apparatus comprising:
a processor configured to
obtain information of light sources defined in a scene that is to be rendered;
define, for each of the light sources, a stochastic function with respect to an object that is a predetermined distance from a respective light source, each of the light source corresponding to a luminance attenuation function in accordance with a distance;
determine, for each of the light sources, a stochastic effective area of the light source based on the stochastic function for the respective light source;
determine, for each of the light sources, whether the stochastic effective area is above a predetermined threshold;
perform a luminance computation for the object in the scene based on one or more light sources, among the light sources, determined to have stochastic effective areas above the predetermined threshold; and
set a quality for a luminance of a screen for which the scene is rendered,
wherein one or more light sources, among the light sources, having stochastic effective areas below the predetermined threshold are omitted from the luminance computation,
wherein the luminance computation includes the luminance computation of the object using a new attenuation function that is statistically unbiased and is obtained by performing a weighting based on the stochastic function of one or more light sources, among the light sources, having a stochastic effective area of the light source, and
the new attenuation function indicates an attenuation function prior to performing a weighting in a range from a corresponding light source until a distance range is defined based on the set quality.

6. A luminance computation method comprising:
obtaining, by a processor, information of light sources defined in a scene that is to be rendered;
defining, by the processor for each of the light sources, a stochastic function with respect to an object that is a predetermined distance from a respective light source, each of the light sources corresponding to a luminance attenuation function in accordance with a distance;
determining, by the processor for each of the light sources, a stochastic effective area of the light source based on the stochastic function for the respective light source;
determining, by the processor for each of the light sources, whether the stochastic effective area is above a predetermined threshold;
performing, by the processor, a luminance computation for the object in the scene based on one or more light sources, among the light sources, determined to have stochastic effective areas above the predetermined threshold; and
setting a quality for a luminance of a screen for which the scene is rendered,
wherein one or more light sources, among the light sources, having stochastic effective areas below the predetermined threshold are omitted from the luminance computation,
wherein the performing the luminance computation includes performing the luminance computation of the object using a new attenuation function that is statistically unbiased and is obtained by performing a weighting based on the stochastic function of one or more light sources, among the light sources, having a stochastic effective area of the light source, and
the new attenuation function indicates an attenuation function prior to performing a weighting in a range from a corresponding light source until a distance range is defined based on the set quality.

* * * * *